US007821551B2

(12) United States Patent
Shinohara

(10) Patent No.: US 7,821,551 B2
(45) Date of Patent: Oct. 26, 2010

(54) SOLID-STATE IMAGE PICKUP DEVICE WITH AN ANALOG MEMORY AND AN OFFSET REMOVING UNIT

(75) Inventor: Mahito Shinohara, Machida (JP)

(73) Assignee: Canon Kabushiki Kaisha, Tokyo (JP)

( * ) Notice: Subject to any disclaimer, the term of this patent is extended or adjusted under 35 U.S.C. 154(b) by 1181 days.

(21) Appl. No.: 11/119,697

(22) Filed: May 3, 2005

(65) Prior Publication Data

US 2005/0253945 A1    Nov. 17, 2005

(30) Foreign Application Priority Data

May 13, 2004   (JP)   .............................. 2004-143759

(51) Int. Cl.
*H04N 5/217* (2006.01)

(52) U.S. Cl. .................................................... 348/241

(58) Field of Classification Search ................ 348/241, 348/300, 301, 308–310, 243, 294
See application file for complete search history.

(56) References Cited

U.S. PATENT DOCUMENTS

| | | | |
|---|---|---|---|
| 4,571,626 A | 2/1986 | Yamada | 358/213 |
| 4,962,412 A | 10/1990 | Shinohara et al. | 357/30 |
| 5,008,206 A | 4/1991 | Shinohara et al. | 437/3 |
| 5,060,042 A | 10/1991 | Shinohara et al. | 357/30 |
| 5,086,326 A | 2/1992 | Shinohara et al. | 357/30 |
| 5,146,339 A | 9/1992 | Shinohara et al. | 358/212 |
| 5,280,358 A | 1/1994 | Yushiya et al. | 358/213.17 |
| 5,379,068 A | 1/1995 | Hamasaki | 348/322 |
| 6,067,113 A * | 5/2000 | Hurwitz et al. | 348/241 |
| 6,084,229 A | 7/2000 | Pace et al. | 250/208.1 |
| 6,128,039 A | 10/2000 | Chen et al. | |
| 6,147,338 A | 11/2000 | Takahashi | 250/208.1 |
| 6,828,601 B2 | 12/2004 | Shinohara | 257/183.1 |
| 6,876,019 B2 | 4/2005 | Shinohara | 257/292 |
| 7,714,919 B2 * | 5/2010 | Inoue et al. | 348/300 |
| 2004/0036789 A1 | 2/2004 | Shinohara | 348/308 |
| 2005/0121519 A1 | 6/2005 | Shinohara | 235/454 |
| 2005/0253946 A1 | 11/2005 | Shinohara | 348/300 |

FOREIGN PATENT DOCUMENTS

EP          0 766 257 A       4/1997

(Continued)

OTHER PUBLICATIONS

Foreign Search Report dated Jan. 31, 2007, issued in counterpart application.

(Continued)

*Primary Examiner*—Jason Chan
*Assistant Examiner*—Gary C Vieaux
(74) *Attorney, Agent, or Firm*—Fitzpatrick, Cella, Harper & Scinto

(57) ABSTRACT

A solid-state image pickup device is provided that includes coupling capacitors, a memory unit, amplifiers, and a circuit for removing an output offset. The capacitors reduce pixel noise by clamping signals from the pixels. The amplifiers amplify signal voltages from the coupling capacitors and write the amplified signal voltages to analog memory cells of the memory unit. The circuit removes the output offset of an amplifier and an analog memory cell.

5 Claims, 9 Drawing Sheets

FOREIGN PATENT DOCUMENTS

| | | |
|---|---|---|
| EP | 0 766 257 A1 | 4/1997 |
| EP | 1 391 933 A | 2/2004 |
| JP | 58-125982 | 7/1983 |
| JP | 01-292856 A | 11/1989 |
| JP | 02-065380 A | 3/1990 |
| JP | 02-65380 A | 3/1990 |
| JP | 2003-51989 A | 2/2003 |
| JP | 2003-051989 A | 2/2003 |
| JP | 2003051989 A  * | 2/2003 |

OTHER PUBLICATIONS

Yusa, A., et al., "*SIT Image Sensor: Design Consideration and Characteristics,*" IEEE Transactions on Electron Devices, vol. ED-33, No. 6 (Jun. 1986), pp. 735-742.

Tanaka, N., et al., "*A 310K Pixel Bipolar Imager (BASIS),*" IEEE Transactions on Electron Devices, vol. 37, No. 4 (Apr. 1990), pp. 964-971.

Nakamura et al., "*Gate Accumulation Type MOS Phototransistor Image Sensor*", The Journal of the Institute of Television Engineers of Japan, vol. 41, No. 11 (Nov. 1987), pp. 1075-1082 (with an English translation).

Mendis, S. K., et al., "*A 128×128 CMOS Active Image Sensor for Highly Integrated Imaging Systems,*" IEDM Tech. Dig. (Dec. 1993), pp. 583-586.

* cited by examiner

SOLID-STATE IMAGE PICKUP DEVICE WITH AN ANALOG MEMORY AND AN OFFSET REMOVING UNIT

BACKGROUND OF THE INVENTION

1. Field of the Invention

The present invention relates to a solid-state image pickup device and an image pickup system, and more particularly to an amplifying type solid-state image pickup device and a camera, both provided with a photoelectric conversion pixel unit composed of a plurality of arranged pixels, each equipped with at least a photoelectric conversion unit and a transistor for amplifying and outputting a signal from the photoelectric conversion unit.

2. Related Background Art

As a solid-state image pickup device, a CCD has been conventionally used in many cases because of the goodness of the SN ratio thereof. However, on the other hand, the development of the so-called amplifying type solid-state image pickup device having the advantages of the easiness of handling and the smallness of the power consumption thereof has been also performed. The amplifying type solid-state image pickup device is a solid-state image-pickup device of the type of leading the signal charges stored in light-receiving pixels to the control electrodes of the transistors provided to the pixel units and outputting an amplified signal from the main electrode. To put it concretely, as the amplifying type solid-state image pickup device, there are an SIT image sensor using SIT's as amplifying transistors (A. Yusa, J. Nishizawa et al., "SIT image sensor: Design consideration and characteristics," IEEE trans. Vol. ED-33, pp. 735-742, June 1986), BASIS using bipolar transistors (N. Tanaka et al., "A 310K pixel bipolar imager (BASIS)," IEEE Trans. Electron Devices, vol. 35, pp. 646-652, May 1990), CMD using JFET's in which control electrodes are depleted (Nakamura et al., "Gate Storage Type MOS Phototransistor Image Senso", The Journal of the Institute of Television Engineers of Japan, 41, 11, pp. 1075-1082 November, 1987), a CMOS sensor using MOS transistors (S. K. Mendis, S. E. Kemeny and E. R. Fossum, "A 128×128 CMOS active image sensor for highly integrated imaging systems," in IEDM Tech. Dig., 1993, pp. 583-586.), and the like.

In particular, a CMOS sensor has good matching with a CMOS process, and peripheral CMOS circuits can be made to be on-chip. Accordingly, energy has been thrown to the development of the CMOS sensor. However, as a common problem of these amplifying type solid-state image pickup devices, the following problem can be cited. That is, since the output offset of the amplifying transistor provided to each pixel differs from each other, a fixed pattern noise (FPN) is superposed on a signal of the image sensor. For reducting the FPN, various signal readout circuits have been devised conventionally.

Another problem of the amplifying type solid-state image pickup device relates to operation timing. The read of pixel signals of this type of image sensor is performed to one row at a time, and a horizontal transfer operation follows after the read of the data of one row. Consequently, signal storage operation of a pixel shifts for every row. The reason is that the signal storage operation of the pixels in one field is completed by the read of the pixel signals of the field. Therefore, the timing shift between the first row and the last row is almost one field time. On the other hand, in a CCD, all pixel signals are transferred to vertical CCD's all at once, and the storage operation of the CCD pixels is completed and started by this simultaneous transfer. Consequently, the operations of the CCD pixels are simultaneous. When a subject moving at a high speed is photographed, the operation timing shift of the amplifying type image sensor appears as the distortion of an image.

With an object of improving the problem, Japanese Patent Application Laid-Open No. S58-125982 and No. H02-65380 severally propose an image sensor equipped with an analog frame memory composed of memory cells each consisting of a MOS switch and a capacitance. In each of the proposed sensors, pixel signals are transferred to corresponding memory cells for a short time without performing horizontal transfer operations, and then the read of memory signals is performed over almost one field period while performing horizontal transfer. Thereby, the operation timing shift is remarkably shortened.

Moreover, Japanese Patent Application Laid-Open No. 2003-51989 discloses a solid-state image pickup device equipped with an amplifier having a gain exceeding 1, which is provided to each row.

FIG. 8 shows a circuit diagram of a conventional image sensor. In the drawing, reference numeral 1 denotes an amplifying type pixel including at least a photodiode and an amplifying transistor. FIG. 9 is a circuit diagram of a typical CMOS sensor pixel as an example of the amplifying type pixel in FIG. 8. A conventional technique will be described with reference to FIGS. 8 and 9.

As shown in FIG. 9, a pixel 1 is composed of a photodiode 18, a transfer transistor 20 controlled by a pulse φTX, a floating diffusion (FD) portion 19, to which a signal charge from the photodiode 18 is transferred, an amplifying transistor 21, the gate of which is connected to the FD portion 19, a selection transistor 22 for pixel selection, which is controlled by a pulse φSEL, and a reset transistor 23 controlled by a pulse φRES. The selection transistor 22 is connected to a vertical pixel output line 2, and the vertical pixel output line 2 is connected to a current supplying transistor 7 controlled by a pulse φG.

When the pulse φSEL turns to a high level and the selection transistor 22 becomes a conduction state, a current is supplied from the current supplying transistor 7 to the amplifying transistor 21 of the pixel 1 selected by a scan circuit 4 as shown in FIG. 8, and the amplifying transistor 21 operates as a source follower to output its output voltage to the vertical pixel output line 2. The floating diffusion (FD) portion 19 is first reset by the application of the reset pulse φRES to the reset transistor 23, and an output corresponding to the FD potential appears on the vertical pixel output line 2. Although the reference voltage on the side of the vertical pixel output line 2 is dispersed owing to the dispersion of the threshold voltage of the source follower among each pixel, a uniform clamp voltage VR becomes the reference voltage on the side of the vertical memory output line 11 since a clamp transistor 6 and a switch transistor 8 are conducted by pulses φC and φSH. Next, the clamp transistor 6 is made to be in an off-state, and the vertical memory output line 11 side of a coupling capacitor 5 is made to be in a floating state. Then, a pulse φTX is applied to the transfer transistor 20. Thereby, the signal charge existing in the photodiode 18 is transferred to the FD unit 19. The fallen portion of the FD voltage proportional to the signal is read to the vertical pixel output line 2, and is further transferred to the vertical memory output line 11 through the coupling capacitor 5. The signal voltage is written in memory cell capacitance 9 by applying a pulse to a write transistor 10 through a memory selection line 12. The memory selection line 12 is successively selected in accordance with a memory scan circuit 13. The signal voltage written in the memory cell capacitance 9 does not include the fixed pattern noise (F. P. N.) of a pixel by the clamp operation described above. That is, although the signal corresponding to the signal charge existing in the photodiode 18 is read to the vertical pixel output line 2 (the read signal contains a noise component), the noise component is beforehand read to the vertical pixel output line 2. Therefore, the potential change quantity of the vertical pixel output line 2 is based on only a signal component, and the signal transferred to the vertical memory output line 11 through the coupling capacitor 5 is one from which the noise component has been reducted. After the signal transfer from the pixels of every row to each memory has been completed, signal read of each memory is performed as follows.

First, the pulses φC and φSH are applied to the clamp transistor 6 and the switch transistor 8, respectively, and thereby the vertical memory output line 11 is reset to the potential VR. After making the switch transistor 8 in the off-state, the signal voltage stored in the capacitance 9 of the memory cell of the row selected by the memory scan circuit 13 is transferred to the vertical memory output line 11. The signal voltage on the vertical memory output line 11 is transferred in order to a horizontal output line 14 by a horizontal scan circuit 16 through a switch transistor 15 which is scanned by the horizontal scan circuit 16. The signal voltage on the horizontal output line 14 is amplified by an amplifier circuit 17, and is read as a sensor output. A memory signal is thus read by the memory scan circuit 13 and the horizontal scan circuit 16. The transfer time of a pixel signal to a memory is greatly shortened in comparison with the read time of a general CMOS sensor without any memory. Consequently, the defect pertaining to the time difference of the storage operation timing of a pixel can be fully improved.

However, the amplifying type image sensor with a frame memory by the conventional technique has a problem pertaining to the SN ratio. That is, a signal voltage read from a pixel is greatly decreased by a division of the signal on a transfer path of the signal, and further the signal voltage is influenced by thermal noises on the transfer path. The division of a signal takes place by receiving capacitance division at the time of the transfer of the signal. The division of a signal first occurs at the time of the transfer from the vertical pixel output line to the memory capacitance 9, and second occurs at the time of the transfer from the memory capacitance 9 to the horizontal output line 14. The thermal noises occur at the time of resetting a signal path, namely the coupling capacitor 5, the vertical memory output line 11, the memory capacitance 9 and the horizontal output line 14. The noise charges are expressed by $(kTC)^{1/2}$, where k denotes a Boltzmann's constant, T denotes an absolute temperature, and C denotes the capacitance at a part to be reset.

SUMMARY OF THE INVENTION

It is an object of the present invention to provide a solid-state image pickup device having a small operation timing shift and a sensor output of a high SN ratio.

A solid-state image pickup device according to the present invention is one including a photoelectric conversion pixel unit composed of a plurality of arranged pixels each equipped with at least a photoelectric conversion unit and a transistor for amplifying and outputting a signal from the photoelectric conversion unit, and a memory unit composed of two-dimensionally arranged analog memory cells corresponding to at least a part of pixels of the photoelectric conversion pixel unit, the device including:

a plurality of coupling capacitors connected to a plurality of output lines, respectively, to each of which the pixels arranged in a column are commonly connected, for reducing noises of the pixels by clamping signals from the pixels;

a plurality of amplifiers each connected to the plurality of coupling capacitors for amplifying a signal voltages from the coupling capacitors and writing the amplified signal voltages to the analog memory cells; and circuit means for removing output offset of at least one group of the groups of the amplifiers and the analog memory cells.

In the present invention, as for the FPN produced by the amplifier provided to each column and/or the FPN produced by the amplification in a memory cell, a high SN ratio can be realized by outputting an FPN output and a signal, and by reducting the FPN by performing the subtraction between both the FPN output and the signal. The problems of the reduction of a signal by signal division and the influence of the noises accompanying the signal reduction are suppressed by the pixel signal amplification with a column amplifier (and further signal amplification by an amplifying transistor provided in an analog memory cell).

According to the present invention, an amplifying type image sensor having a short time shift of the operation timing of pixels while maintaining a sensor output having a high SN ratio can be realized. Moreover, according to the present invention, an amplifying type image sensor having a short time shift of the operation timing of pixels while maintaining a sensor output having a high SN ratio can be realized by relatively easy designing.

Furthermore, according to the present invention, an amplifying type image sensor having a short time shift of the operation timing of pixels while maintaining a sensor output having a further higher SN ratio can be realized.

DETAILED DESCRIPTION OF THE PREFERRED EMBODIMENTS

Figure 8:
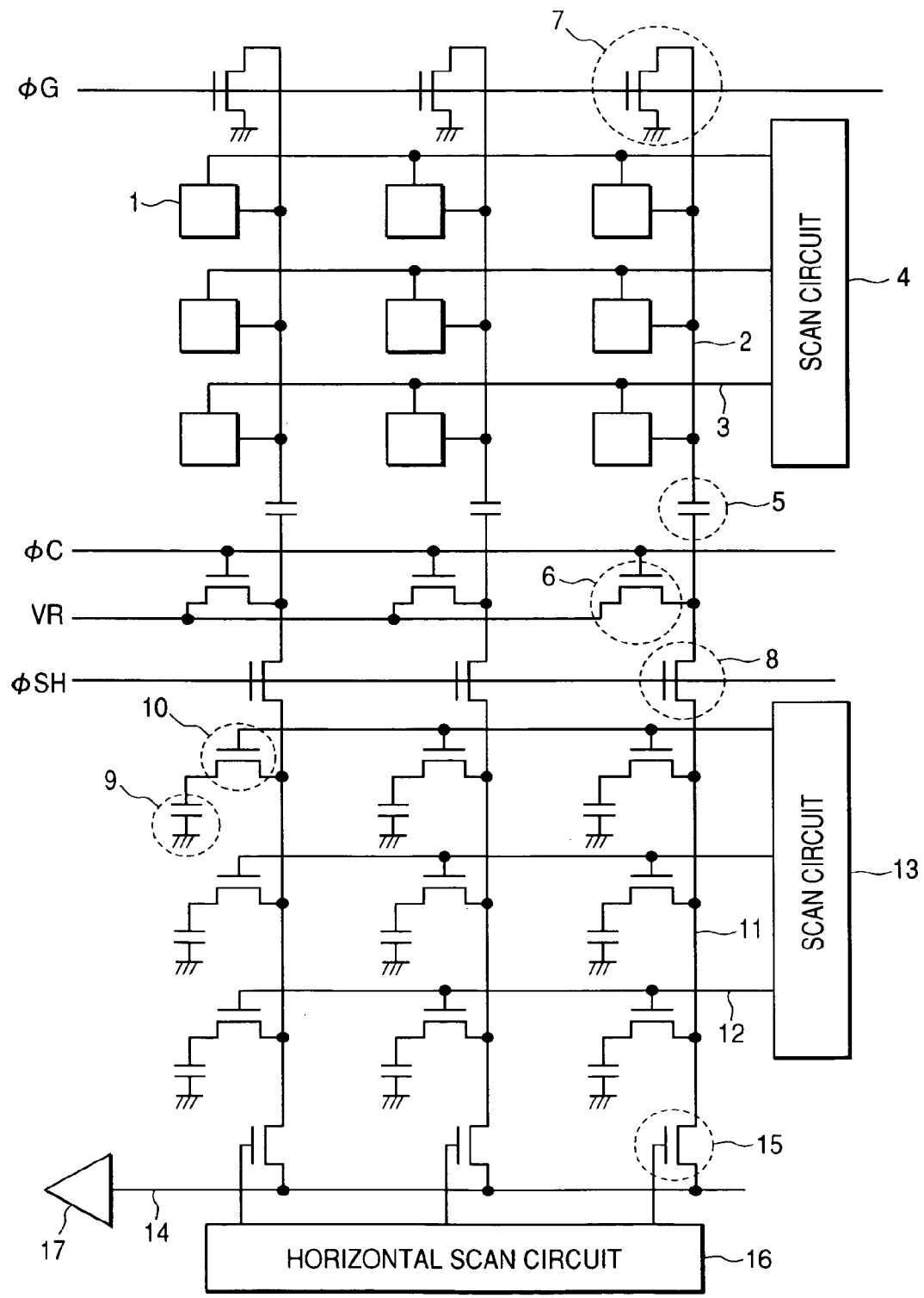
FIG. 8 is a circuit diagram showing an amplifying type image sensor including a frame memory by a conventional technique.
Figure 9:
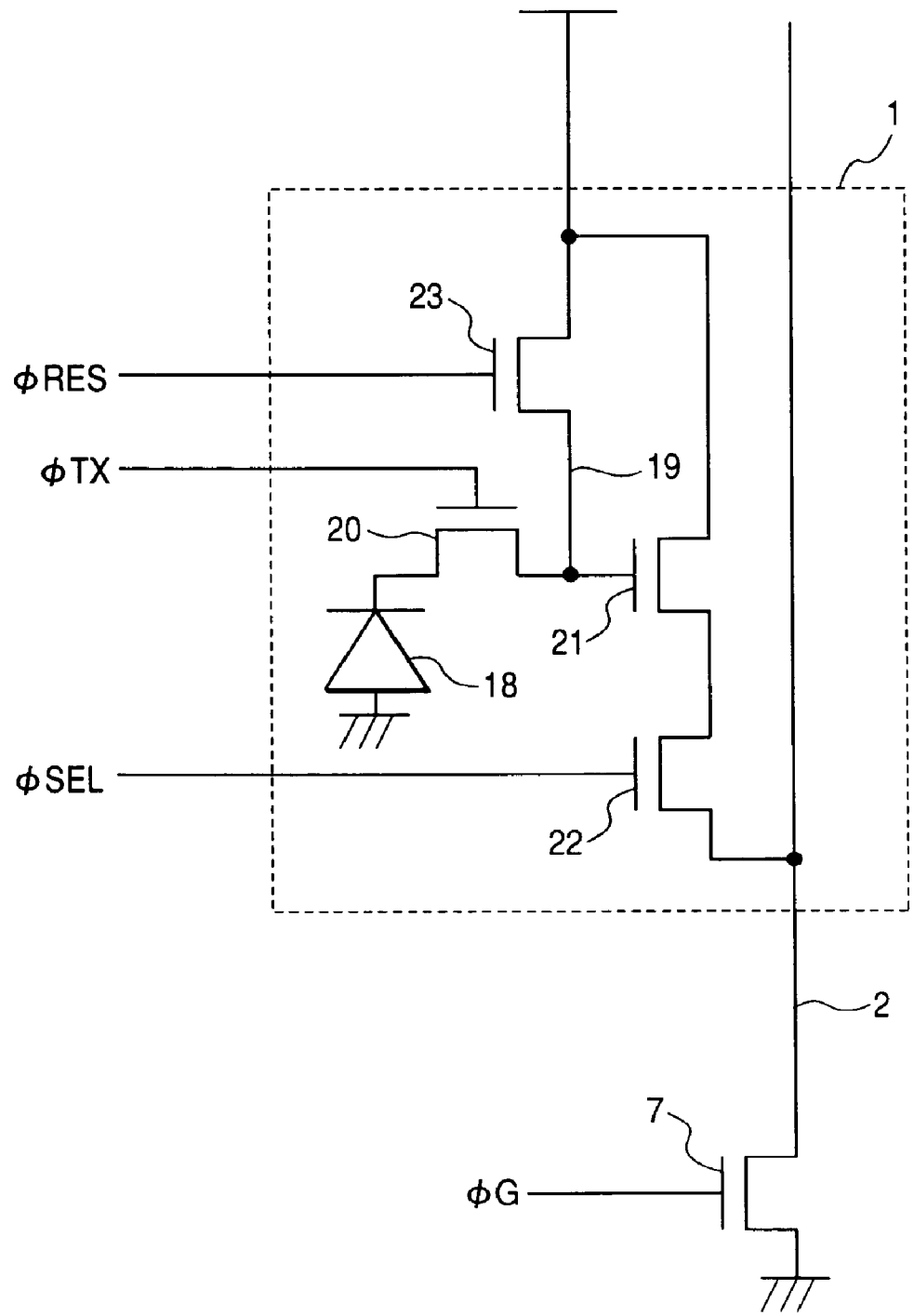
FIG. 9 is a circuit diagram showing a conventional typical CMOS sensor pixel.

In the following, in the explanatory diagrams of the embodiments of the present invention, the same members as those shown in FIGS. 8 and 9 are denoted by the same reference numerals as those in FIGS. 8 and 9.

First Embodiment

Figure 1:
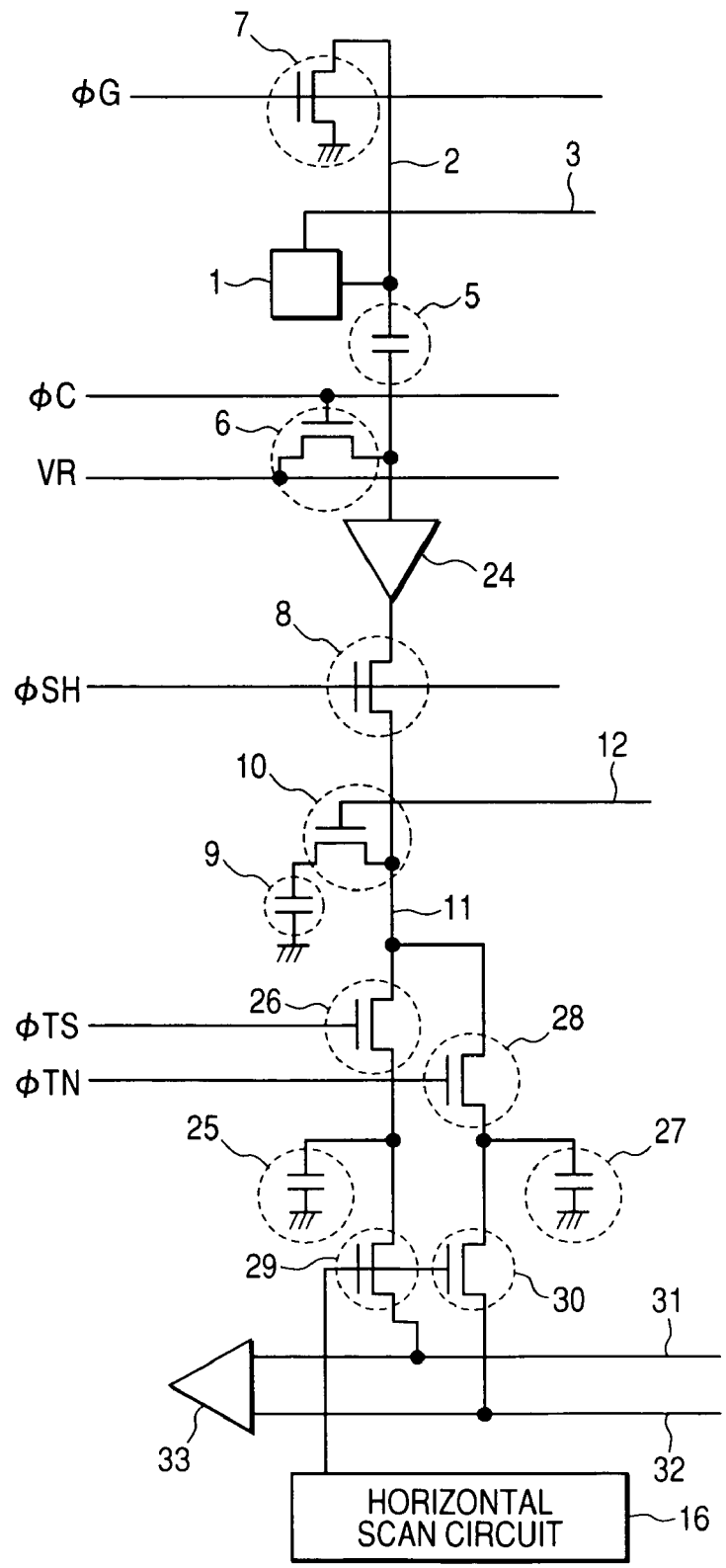
FIG. 1 is a circuit diagram showing a sensor configuration according to a first embodiment of the present invention.

FIG. 1 shows a sensor circuit diagram along a signal path from a pixel to a sensor output in a first embodiment of the present invention. Although one pixel, one memory cell and read means for one column are shown here for simplification, actually the pixels and the memory cells are arranged two-dimensionally, and the read means is provided to each column, as shown in FIG. 8. In addition, although, as for the pixels and the memory cells, the pixels and the memory cells of 3×3 are shown, respectively, for simplification in FIG. 8, the number of the pixels and the number of the memory cells may be set according to a need, and the number of the memory cells may be fewer than the number of the pixels. For example, although the number of the memory cells is fewer than the number of pixels when the signals from a plurality of pixels are added or thinned to be stored in the memory cells, it is of course that the number of the memory cells of the number corresponding to the number of picture elements required in order to form an image is needed. For example, in order to form an image of VGA, a memory unit including 640×480 memory cells is needed. In such a way, the number of memory cells in accordance with the standard of an image to be formed is needed. Consequently, hundreds or more of rows and columns are frequently needed in the arrangement of the memory cells. The configuration the pixel 1 is the same as that shown in FIG. 9. In addition, as long as the pixels are amplifying type pixels, the pixels are not limited to CMOS sensor pixels especially, but the amplifying type solid-state image pickup devices such as the above-mentioned CMD can be used. Moreover, it is natural that it is also applicable to a threshold voltage modulation image sensor (VMIS), a buried charge accumulator and sensing transistor array (BCAST), a lateral buried charge accumulator and sensing transistor array (LBCAST), and the like. In particular, to the BCAST and LBCAST, it can be implemented without any essential changes by replacing the amplifying MOS transistors with JFET transistors.

Figure 2:
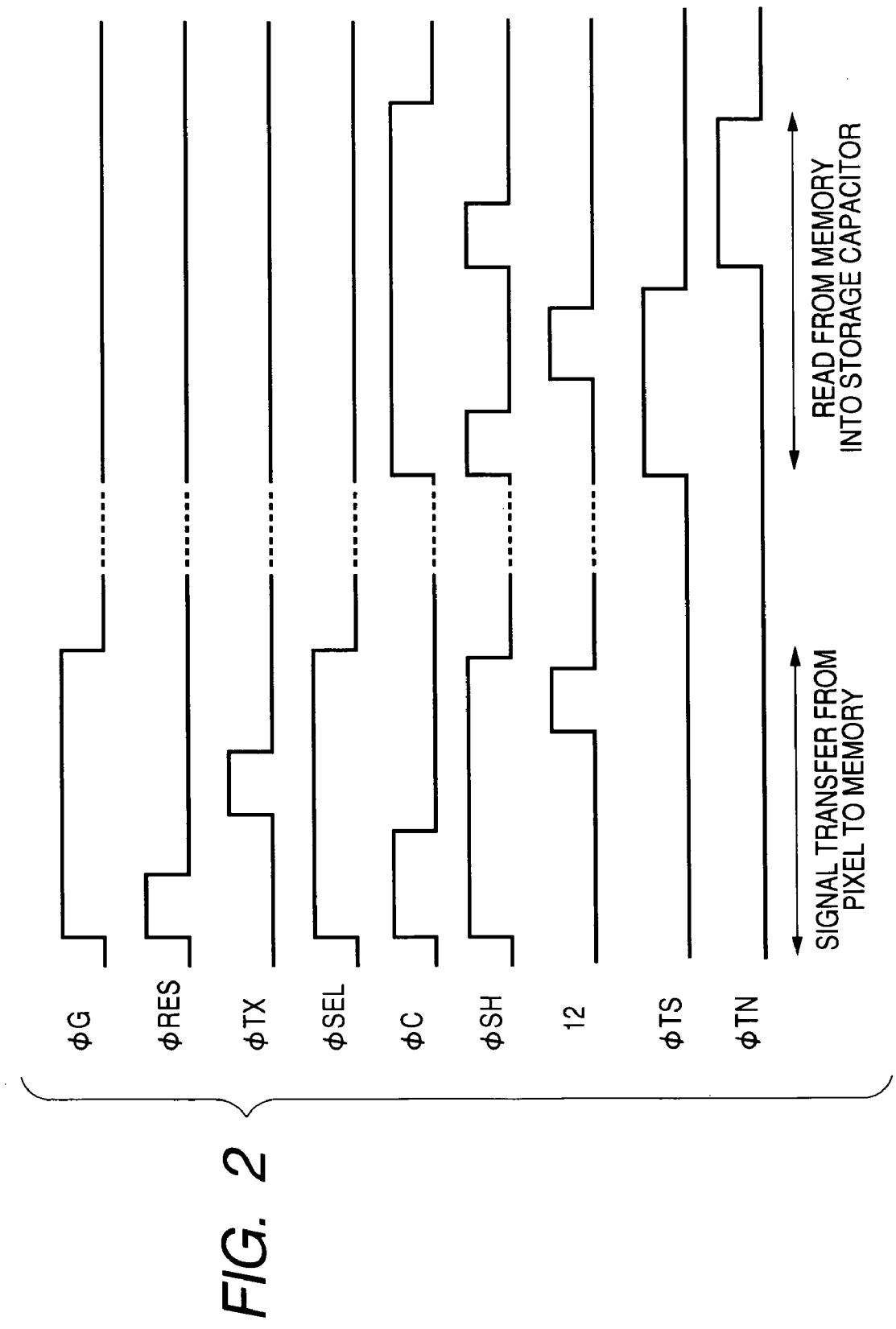
FIG. 2 is a pulse timing chart illustrating the operation of the sensor shown in FIG. 1.

FIG. 2 is a pulse timing chart for the operation of the sensor in FIG. 1. The configuration of FIG. 1 is different from the configuration of FIG. 8 in that a column amplifier 24, storage capacitance 25 and 27, and switch transistors 26, 28, and 30 are provided, and that the amplifier circuit 17 is replaced with a differential amplifier 33. Since the function and the operation of each member other than these members are the same as that of each member of FIG. 8, the descriptions of them are omitted. Moreover, the scan circuits 4 and 13 shown in FIG. 8 are omitted in FIG. 1 for simplification.

In FIG. 1, the input terminal of the column amplifier 24 is connected to the coupling capacitor 5, and the column amplifier 24 amplifies a clamp signal of a pixel at such a high gain that the decrease of the SN ratio caused by the signal division and the thermal noises in the signal path after a frame memory can be compensated. The storage capacitance 25 receives a signal from a memory cell composed of the memory cell capacitance 9 and the write transistor 10 through the switch transistor 26, and the storage capacitance 27 receives the offset output from the column amplifier 24 through the switch transistor 28. The voltages received by the storage capacitance 25 and the storage capacitance 27 are transmitted to the horizontal output lines 31 and 32 through the switch transistors 29 and 30, respectively. The input terminals of the differential amplifier 33 are connected to the horizontal output lines 31 and 32, respectively. The differential amplifier 33 amplifies a voltage difference at the two input portions to output the amplified voltage difference. The final sensor output from the differential amplifier 33 is hardly influenced by the thermal noises, and the sensor output has a high SN ratio and includes no offset of the column amplifier 24, either.

The operation will be described according to FIG. 2. First, a pixel output is transferred to a memory cell. The pulse timing for the operation is the same as that in the conventional technique described in FIGS. 8 and 9. However, the signal voltage is different from that in the conventional technique in that the signal voltage is a pixel signal voltage amplified by the column amplifier 24 and does not receive the capacitance division between the coupling capacitor 5 and the memory cell capacitance 9 like the conventional technique shown in FIG. 8, and that the pixel signal voltage includes the offset of the column amplifier 24.

After a series of signal transfer from the pixel to the memories has been completed, the reading of the memory signals to the storage capacitance 25 and 27 is performed. In this operation, the input portion of the column amplifier 24 is clamped to the potential VR by the clamp transistor 6, which is made to be in the on-state by the pulse φC being turned to the high level. The vertical memory output line 11 and the storage capacitance 25 are first reset to the offset output of the column amplifier 24 through the switch transistors 8 and 26, which have been made to the on-state by the pulses φSH and φTS turned to the high level, respectively. After turning off the switch transistor 8 by turning the pulse φSH to the low level, the memory selection line 12 is turned to the high level to turn the write transistor 10 to be in the on-state. Thereby, the signal on the memory capacitance 9 is released to the vertical memory output line 11 and the storage capacitance 25. The signal is sampled on the storage capacitance 25 by applying the pulse φS to the switch transistor 26.

Next, the pulses φSH and φTN are made to be the high level, and the switch transistors 8 and 28 are made to be in their on-states, respectively. Through the switch transistors 8 and 28, the vertical memory output line 11 and the storage capacitance 27 are reset to the offset output of the column amplifier 24, respectively. The offset is sampled to the storage capacitance 27 by applying a pulse φTN to the switch transistor 28.

A horizontal scan performed in succession to the above-mentioned operation is omitted in FIG. 2, but the horizontal scan is performed by the horizontal scan circuit 16. The horizontal scan circuit 16 scans the transistors 29 and 30, which are a pair of switches, and transmits the voltages on the storage capacitance 25 and 27 to the horizontal output lines 31 and 32, respectively. The differential amplifier 33 cancels the offset of the column amplifier 24, and outputs a sensor signal having a high SN ratio.

Second Embodiment

Figure 3:
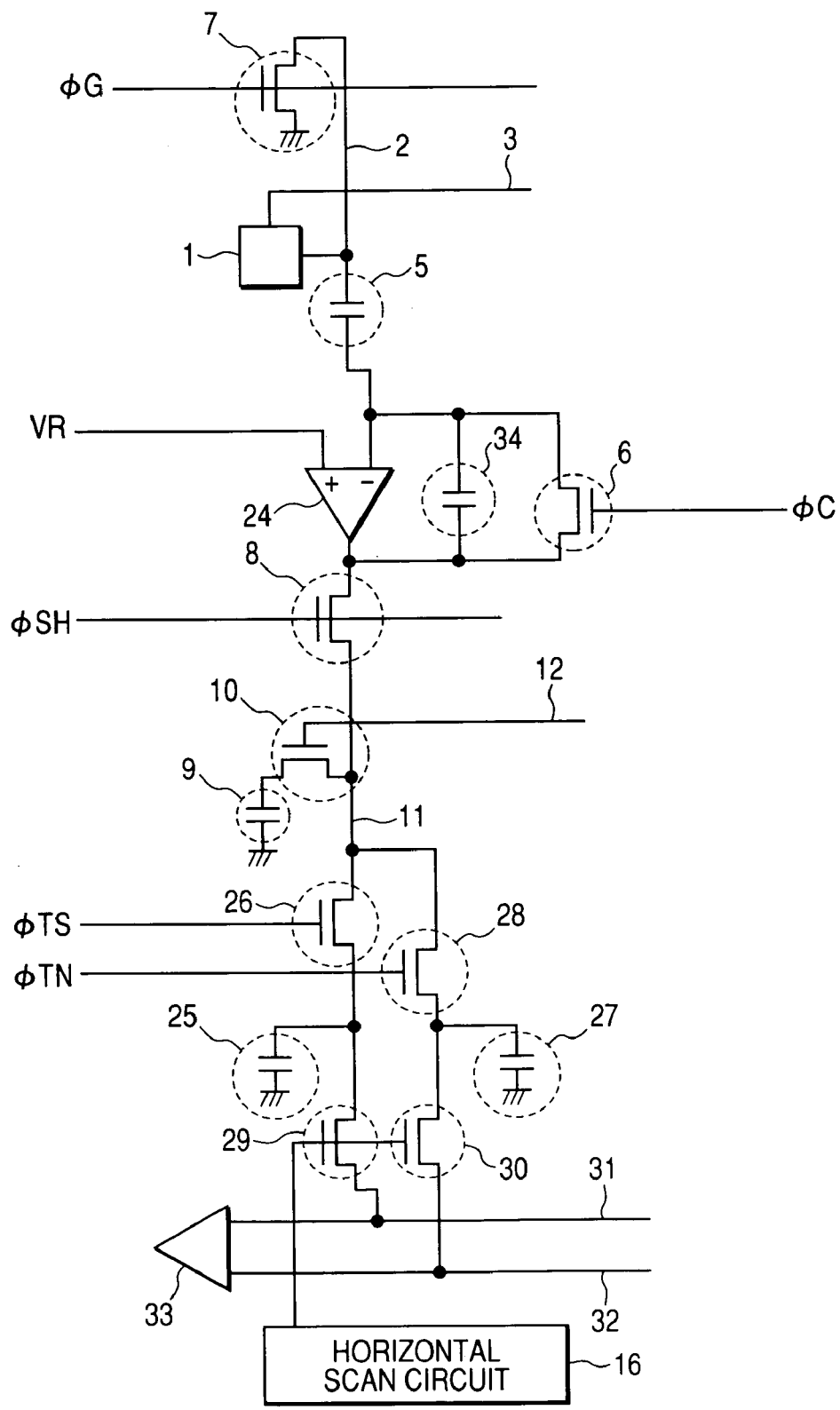
FIG. 3 is a circuit diagram showing a sensor configuration according to a second embodiment of the present invention.

FIG. 3 shows a sensor circuit diagram along a signal path from a pixel to a sensor output in a second embodiment of the present invention. In FIG. 3, the column amplifier 24 is a feedback type amplifier, and the output thereof is transmitted to the negative input terminal thereof through a coupling capacitor 34. Consequently, the gain of the column amplifier 24 is determined by a ratio of the capacitance of the coupling capacitor 5 and the coupling capacitor 34. The positive input terminal (+) of the column amplifier 24 is fixed to the clamp voltage VR. The negative input terminal (−) of the column amplifier 24 is clamped to the clamp voltage VR by applying a pulse φC to the clamp transistor 6. The reason of the clamping of the negative input terminal (−) to the clamp voltage VR is that the above-mentioned two input terminals are in the state of being imaginarily shorted. Consequently, the pulse timing for performing the operation of the sensor configuration is the same as that of the first embodiment shown in FIG. 2. However, the circuit of FIG. 3 has features such that the coupling capacitor 5 for clamping also performs the role of determining the gain of the column amplifier 24, and that the circuit is easy to design a high gain column amplifier. When a signal output voltage of the pixel is amplified at a high gain by the column amplifier 24, the lowering of the signal voltage is further suppressed, and consequently a signal output having a further higher SN ratio is maintained. As the feedback type amplifier, a feedback type amplifier using capacitance is preferable. For example, in case of a feedback type amplifier using resistance, when the resistance value is small, the current value becomes larger and the power consumption becomes larger. When the resistance value is made to be large, noises become large and responsibility becomes worse. In consideration of these respects, the feedback type amplifier using capacitance is more preferable.

Third Embodiment

Figure 4:
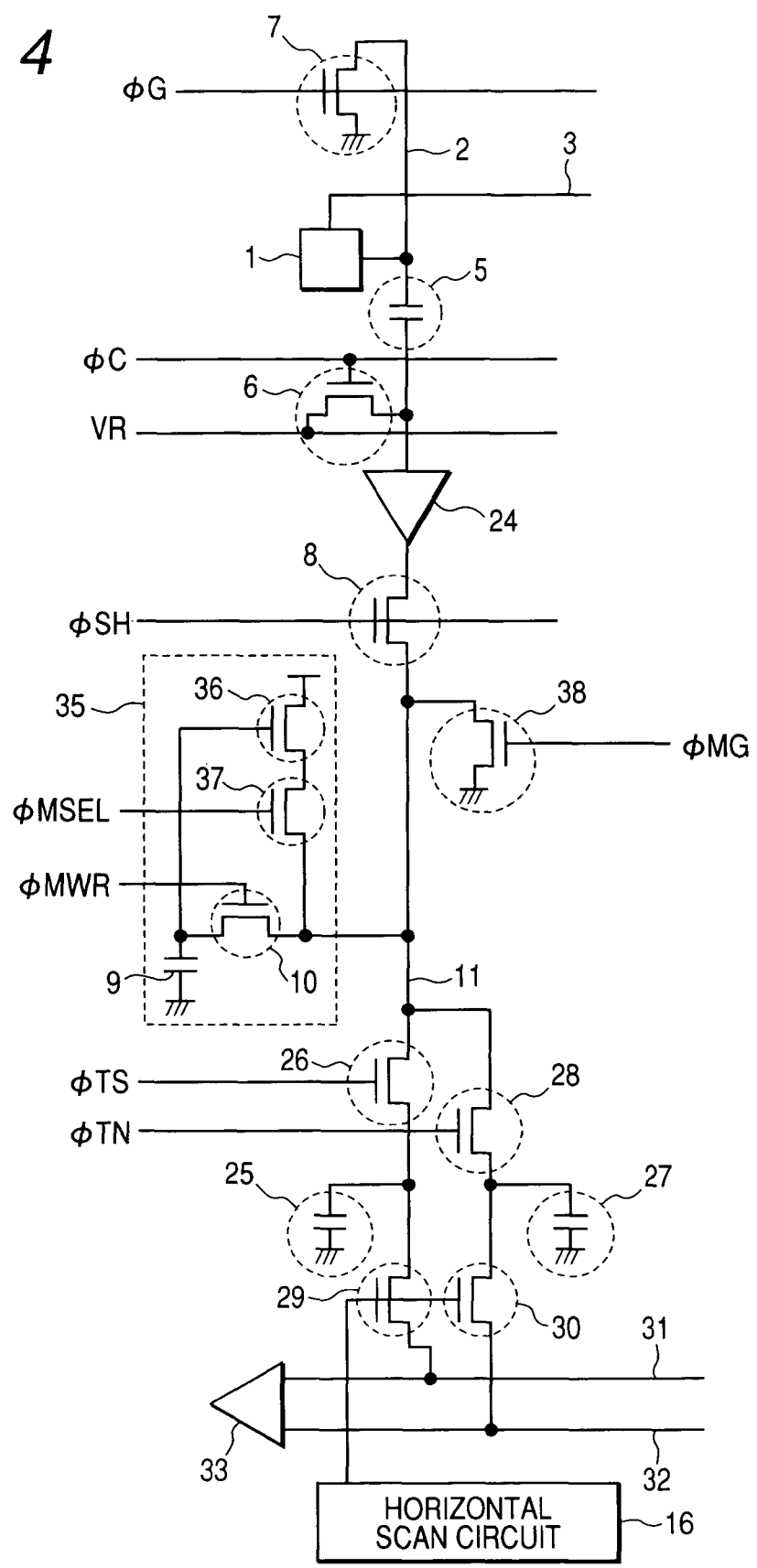
FIG. 4 is a circuit diagram showing a sensor configuration according to a third embodiment of the present invention.

FIG. 4 shows a sensor circuit diagram along a signal path from a pixel to a sensor output in a third embodiment of the present invention. In the same figure, a memory in which the cell has an amplifying function is used. For example, as U.S. Pat. No. 5,805,492 discloses one configuration, such an amplifying type analog memory cell has already existed. In FIG. 4, a memory cell 35 is composed of an amplifying transistor 36, a memory selection transistor 37, a write transistor 10 and a memory cell capacitance 9.

A current supplying transistor 38 supplies a current so that the amplifying transistor 36 may work as a source follower. In the third embodiment of the present invention, the amplifying type frame memory is used in place of the DRAM type memory used in the first and the second embodiments.

Figure 5:
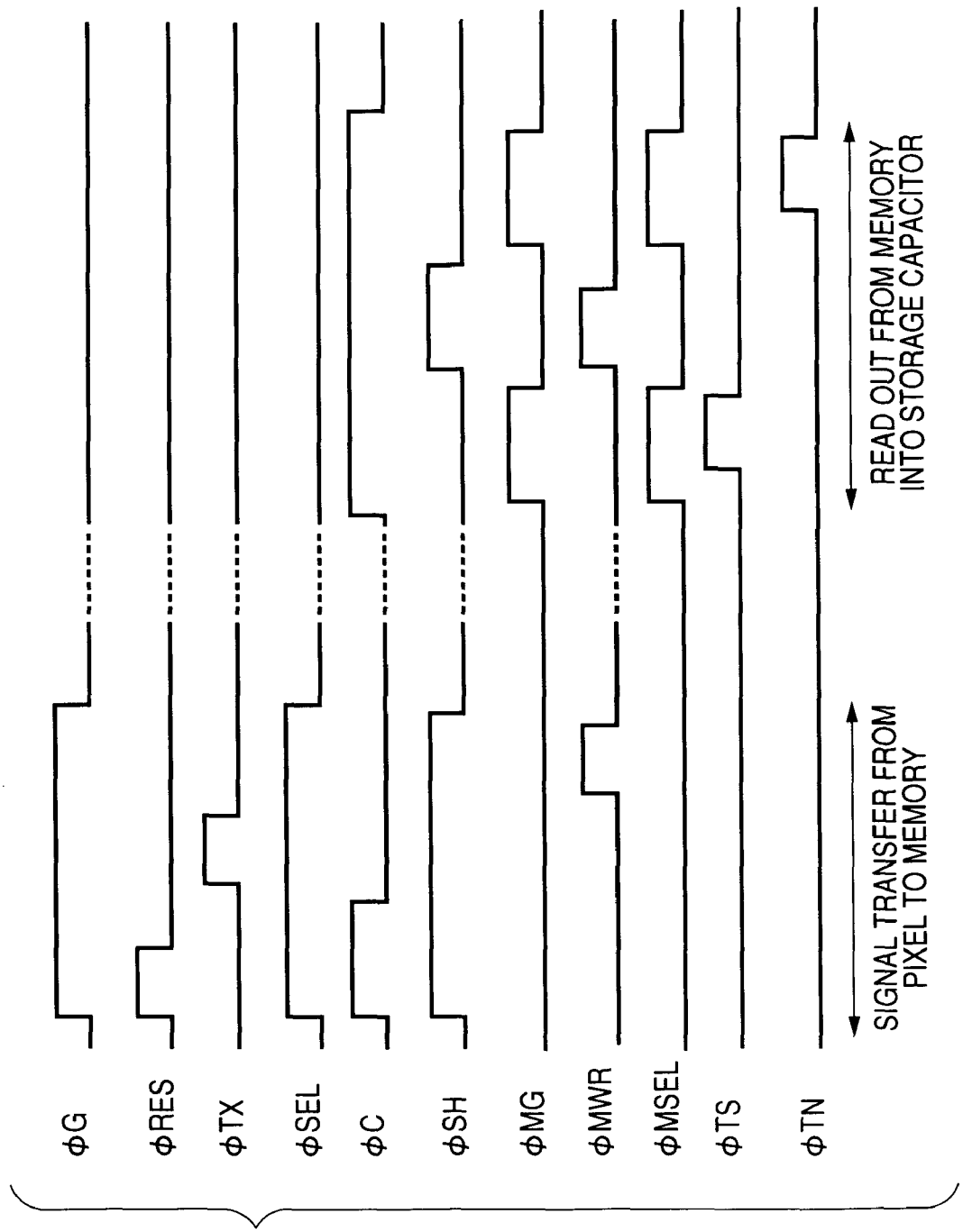
FIG. 5 is a pulse timing chart illustrating the operation of the sensor shown in FIG. 4.

FIG. 5 is a pulse timing chart showing the sensor operation of the third embodiment of the present invention. The operation will be described with reference to FIGS. 4 and 5. The signal transfer from the pixel to the memory is performed like in the first embodiment described in FIG. 2. However, the memory write pulse denoted by the reference numeral 12 in FIG. 2 is denoted by reference mark φMWR in FIG. 5.

Signal reading from the memory cell is performed by applying pulses φMG and φMSEL to the current supplying transistor 38 and the memory selection transistor 37, respectively. The output of the selected memory cell is read on the vertical memory output line 11, and is sampled by the storage capacitance 25 through the switch transistor 26. Next, the offset of the column amplifier 24 is written in the memory cell by applying the pulses φSH and φMWR to the switch transistor 8 and the write transistor 10, respectively, with the clamp transistor 6 being conducted.

The reading and the sampling of the offset written in the memory cell are the same as those of the signal written in the memory cell. The sampling of the offset output from the memory cell to the storage capacitance 27 is performed by applying the pulse φTN to the switch transistor 28. In addition to the amplified pixel signal and the offset of the column amplifier 24, the voltage on the storage capacitance 25 includes the offset of an amplifying transistor 36. On the other hand, in addition to the offset of the column amplifier 24, the voltage on the storage capacitance 27 includes the offset of the amplifying transistor 36. Therefore, the fixed pattern noise resulting from these pieces of offset is not contained in the final sensor output from the differential amplifier 33. The fall of a signal voltage is not produced in the reading from the memory to the storage capacitance in the third embodiment owing to the amplification operation which the memory cell 35 has. Consequently, the third embodiment can output the signal of the higher SN ratio in comparison with the first and the second embodiments.

In each embodiment described above, the number of the memory cells which corresponds to at least a part of the pixels and the number of the picture elements necessary for forming an image may be installed. Moreover, as for the column amplifier, as long as an amplifier which amplifies a signal voltage by the gain exceeding 1 in order to compensate the division of a signal, the use of such an amplifier makes the signal voltage lowering prevention effect more remarkable.

To add further, further some embodiments based on the spirit of the present invention can be configured. For example, in order to prevent the division of a signal in the signal transfer from a memory to storage capacitance, the configuration of connecting a still further column amplifier to a vertical memory output line can be considered. Moreover, as an offset removal circuit, in addition to the circuits cited in the embodiments, some well-known techniques such as a circuit using a clamp circuit and the like exist, and those may be adopted.

Moreover, in each of the above-mentioned embodiments, although the solid-state image pickup device can be formed on the same semiconductor substrate, the differential amplifier 33 may be provided out of the substrate so that the noises produced by the differential amplifier 33 may not influence the other circuit members.

An embodiment in the case where the solid-state image pickup device according to the present invention is applied to a still camera coping with a moving image will be described in full detail with reference to FIG. 6.

Figure 6:
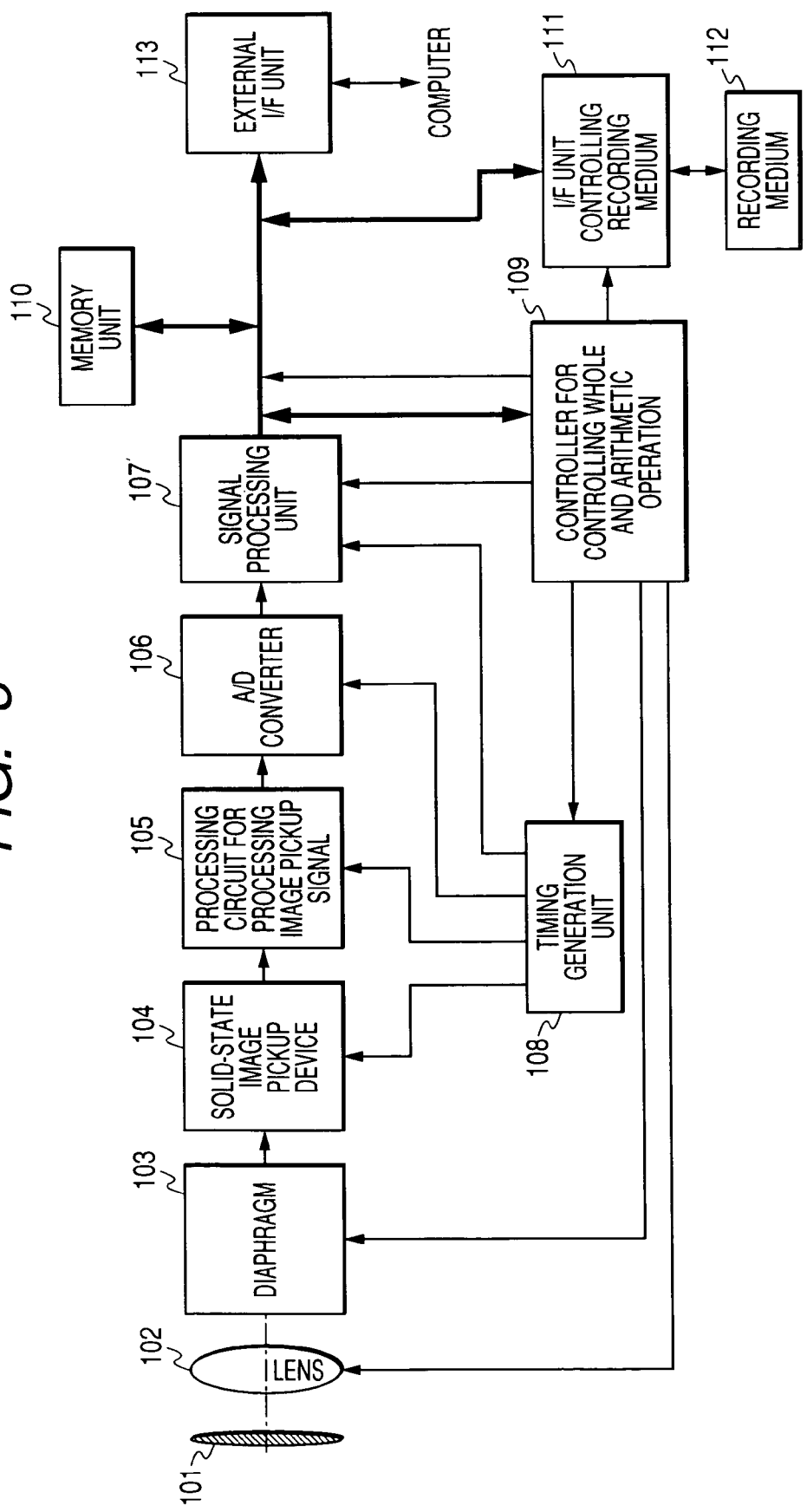
FIG. 6 is a block diagram showing the case where a solid-state image pickup device according to the present invention is applied to a "still video camera" coping with a moving image.

FIG. 6 is a block diagram showing the case where the solid-state image pickup device according to the present invention is applied to a "still camera" coping with a moving image.

In FIG. 6, reference numeral 101 denotes a barrier serving both as a protection of a lens and a main switch. Reference numeral 102 denotes a lens for forming an optical image of a subject on an image pickup device (solid-state image pickup device) 104. Reference numeral 103 denotes a diaphragm for varying the amount of the light which has passed through the lens 102. The reference numeral 104 denotes the image pickup device for taking in the subject formed as an image by the lens 102 as an image signal. Reference numeral 106 denotes an A/D converter performing the analog-to-digital conversion of the image signal outputted from the image pickup device 104. Reference numeral 107 denotes a signal processing unit performing various corrections of the image data outputted from the A/D converter 106 or compressing the data. Reference numeral 108 denotes a timing generation unit to output various timing signals to the image pickup device 104, a processing circuit for processing an image pickup signal 105, the A/D converter 106 and the signal processing unit 107. Reference numeral 109 denotes a controller for controlling the whole and arithmetic operation for performing various arithmetic operations and the control of the whole still video camera. Reference numeral 110 denotes a memory unit for storing image data temporarily. Reference numeral 111 denotes an interface unit for performing recording or reading to or from a recording medium. Reference numeral 112 denotes a detachably attachable recording medium such as a semiconductor memory for performing the recording or the reading of image data. Reference numeral 113 denotes an interface unit for communicating with an external computer or the like.

Next, the operation of the still video camera at the time of the photography in the above-mentioned composition. When the barrier 101 is opened, a main power supply is turned on, and then the power supply of a control system turns on. Furthermore, the power supply of image pickup system circuits such as the A/D converter 106 is turned on.

Then, in order to control the amount of exposure, the controller for controlling the whole and arithmetic operation 109 opens the diaphragm 103. After the signal outputted from the image pickup device 104 has been converted by the A/C converter 106, the converted signal is inputted into the signal processing unit 107. Based on the data, the operation of exposure is performed by the controller for controlling the whole and arithmetic operation 109. Judging the brightness based on the result of having performed the light measurement, the controller for controlling the whole and arithmetic operation 109 controls the diaphragm 103 according to the result.

Next, based on the signal outputted from the image pickup device 104, a high frequency component is taken out, and the calculation of the distance to the subject is performed by the controller for controlling the whole and arithmetic operation 109. Then, the lens 101 is driven, and it is determined whether the lens 101 is focused or not. When the lens 101 is determined that it is not focused, the lens 101 is again driven, and distance measurement is performed. Then, after the focused state has been confirmed, actual exposure is started.

After the exposure has been completed, the A/D conversion of the image signal outputted from the image pickup device 104 is performed by the A/D converter 106, and the converted image signal is written in the memory unit 110 by the controller for controlling the whole and arithmetic operation 109 through the signal processing unit 107.

After that, the data stored in the memory unit 110 is recorded in the detachably attachable recording medium 112 such as a semiconductor memory by the control of the controller for controlling the whole and arithmetic operation 109 through the I/F unit controlling recording medium 111.

Moreover, the data may be directly inputted into a computer or the like through the external I/F unit 113 to perform the processing of the image.

Moreover, an example of the case where the solid-state image pickup device of the present invention is applied to a video camera (image pickup system) will be described in full detail with reference to FIG. 7.

Figure 7:
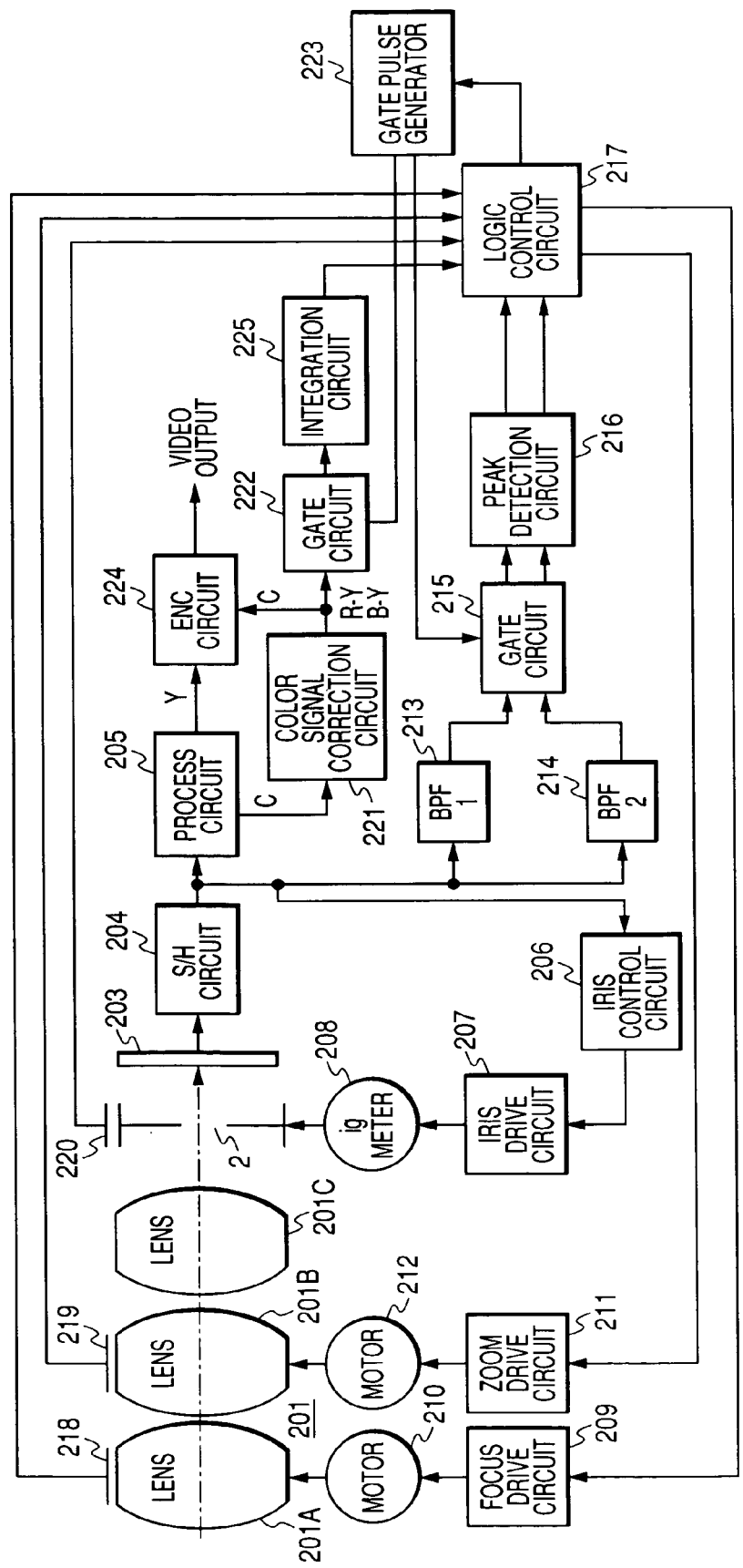
FIG. 7 is a block diagram showing the case where the solid-state image pickup device according to the present invention is applied to a video camera.

FIG. 7 is a block diagram showing the case where the solid-state image pickup device of the present invention is applied to a video camera. Reference numeral 201 denotes a photographing lens equipped with a focus lens 201A for performing focus adjustment, a zoom lens 201B for performing a zooming operation, and a lens for forming an image 201C.

Reference numeral 202 denotes a diaphragm. Reference numeral 203 denotes a solid-state image pickup device photoelectrically converting a subject image formed on an image pickup surface to an electric image pickup signal. Reference numeral 204 denotes a sample-and-hold circuit (S/H circuit) performing the sample hold of the image pick-up signal outputted from the solid-state image pickup device 203, and further performing the amplification of the level. The S/H circuit 204 outputs an image signal.

Reference numeral 205 denotes a process circuit performing predetermined processing of the image signal outputted from the sample-and-hold circuit 204 such as a gamma correction, a color separation and blanking processing. The process circuit 205 outputs a luminance signal Y and a chrominance signal C. The chrominance signal C outputted from the process circuit 205 receives the correction of its white balance and its color balance by a color signal correction circuit 221, and is outputted as color difference signals R-Y and B-Y.

Moreover, the luminance signal Y outputted from the process circuit 205 and the color difference signals R-Y and B-Y outputted from the color signal correction circuit 221 are modulated by an encoder circuit (ENC circuit) 224, and are outputted as a standard television signal. Then, the standard television signal is supplied to a not shown video recorder, or a monitor EVF such as an electronic viewfinder.

Subsequently, reference numeral 206 denotes an iris control circuit. The iris control circuit 206 controls an iris drive circuit 207 based on the image signal supplied from the sample-and-hold circuit 204, and the iris control circuit 206 automatically controls an ig meter in order to control the amount of the opening of the diaphragm 202 so that the level of an image signal may be a fixed value of a predetermined level. Reference numerals 213 and 214 denote band path filters (BPF's) having different restriction bands, which extract a high frequency components necessary for performing focused state detection from the image signal outputted by the sample-and-hold circuit 204. The signals outputted from the first band pass filter 213 (BPF1) and the second band path filter 214 (BPF2) are severally gated by a gate circuit 215 and a focus gate frame signal. Then, the peak values of the gated signals are detected and held by a peak detection circuit 216, and the gated signals are inputted into a logic control circuit 217.

The signals are called as focus voltages, and the lens is focused on the basis of the focus voltages. Moreover, reference numeral 218 denotes a focus encoder detecting a move position of the focus lens 201A. Reference numeral 219 denotes a zoom encoder detecting a focal length of the zoom lens 201B. Reference numeral 220 denotes an iris encoder detecting the amount of the opening of the diaphragm 202. The detection values of these encoders are supplied to a logic control circuit 217 performing system control. Based on the image signal corresponding in a set focusing detection area, the logic control circuit 217 performs the focusing detection to a subject, and performs focus adjustment. That is, the logic control circuit 217 takes in the peak value information of the high frequency components supplied from each of the band path filters 213 and 214. Then, the logic control circuit 217 supplies control signals such as the rotation direction, the rotation speed and the rotation/stop of a focus motor 210 to a focus drive circuit 209 in order to drive the focal lens 201A to the position where the peak value of the high frequency component becomes the maximum, and controls the focal lens 210A.

The present invention can be used for solid-state image pickup devices such as a digital camera (still camera) and a digital video camera, and particularly is suitably used for the solid-state image pickup device capable of photographing a subject operating at a high speed.

This application claims priority from Japanese Patent Application No. 2004-143759 filed on May 13, 2004, which is hereby incorporated by reference herein.

What is claimed is:

1. A solid-state image pickup device with a photoelectric conversion pixel unit that includes a plurality of arranged pixels, each pixel equipped with at least a photoelectric conversion unit and a transistor for amplifying and outputting a signal from the photoelectric conversion unit, the device comprising:

a plurality of coupling capacitors each including at least two terminals, wherein a first terminal of each of the plurality of coupling capacitors is connected to a respective output line, to which pixels arranged in a column are commonly connected, for reducing noises of the pixels by clamping signals from the pixels;

a memory unit that includes two-dimensionally arranged analog memory cells to which the noise-reduced signals are written, wherein the noise-reduced signals are signals for which at least the noises of the pixels have been reduced, and wherein the analog memory cells corresponding to at least a plurality of rows of pixels of the photoelectric conversion pixel unit;

a plurality of amplifiers, each connected to a second terminal of each of the plurality of coupling capacitors of a respective column, for amplifying signal voltage from the coupling capacitor and writing the amplified signal voltages to the analog memory cells of the memory unit, each of the plurality of amplifiers being arranged upstream of the analog memory cells with respect to signal flow; and a circuit for removing an output offset of at least one of an amplifier of the plurality of amplifiers and an analog memory cell of the analog memory cells, wherein the circuit includes a first storage capacitor configured to store the output offset, a first transfer transistor configured to transfer the output offset to the first storage capacitor, a second storage capacitor configured to store a signal from the analog memory cell, and a second transfer transistor configured to transfer the signal from the analog memory cell to the second storage capacitor, wherein the solid-state image pickup device is configured so that:

a first signal output from the amplifier when the coupling capacitor is reset is written to the analog memory cell, the first transfer transistor is controlled to store, in the first storage capacitor, the first signal written to the analog memory cell, a second signal obtained by amplifying the signal from the photoelectric conversion unit by the amplifier is written to the analog memory cell, and the second transfer transistor is controlled to store, in the second storage capacitor, the second signal written to the analog memory cell.

2. A solid-state image pickup device according to claim 1, wherein each coupling capacitor is regarded as a first coupling capacitor, each of the plurality of amplifiers has a feedback type configuration such that a second coupling capacitor implements capacitance coupling of an output terminal and an input terminal of that amplifier, and each of the plurality of amplifiers determines its gain by a ratio of a first coupling capacitance of the first coupling capacitor and a second coupling capacitance of the second coupling capacitor.

3. A solid-state image pickup device according to claim 1, wherein each of the analog memory cells is an amplifying type memory cell that includes at least a signal storage capacitor, a transistor for writing a signal, and a transistor for amplifying the signal.

4. A solid-state image pickup device according to claim 1, further comprising means for performing a subtraction operation between the output offset and a signal from the circuit means.

5. A solid-state image pickup device according to claim 1, wherein the solid-state image pickup device is incorporated in a camera that includes:

an optical system configured to form a light image on the solid-state image pickup device; and a signal processing circuit configured to process an output signal from the solid-state image pickup device.

* * * * *